(12) United States Patent
Dimicelli

(10) Patent No.: US 7,077,921 B1
(45) Date of Patent: Jul. 18, 2006

(54) METHOD TO MAKE AN EXPANDABLE AIR FILTRATION APPARATUS AND DEVICE

(76) Inventor: Anthony Dimicelli, 8282 Warren, Houston, TX (US) 77040

( * ) Notice: Subject to any disclaimer, the term of this patent is extended or adjusted under 35 U.S.C. 154(b) by 241 days.

(21) Appl. No.: 10/689,413

(22) Filed: Oct. 20, 2003

(51) Int. Cl.
*B01D 46/00* (2006.01)

(52) U.S. Cl. .................. 156/60; 156/196; 156/210; 156/217; 156/227; 156/250; 55/495; 55/496; 55/497; 55/499; 55/501; 55/511; 55/521; 55/528; 55/DIG. 5; 55/DIG. 31

(58) Field of Classification Search .............. 55/385.1, 55/495, 496, 497, 499, 501, 503, 511, 521, 55/527, 528, DIG. 5, DIG. 31; 156/60, 183, 156/196, 216, 217, 221, 223, 227, 250
See application file for complete search history.

(56) References Cited

U.S. PATENT DOCUMENTS

| | | | | |
|---|---|---|---|---|
| 1,122,437 A * | 12/1914 | Sweeney | .................. | 55/496 |
| 2,175,903 A * | 10/1939 | Lichtman | .................. | 55/496 |
| 2,203,311 A * | 6/1940 | Sinclair | .................. | 55/496 |
| 5,460,787 A * | 10/1995 | Colon | .................. | 55/504 |
| 5,462,569 A * | 10/1995 | Benjamin | .................. | 55/501 |
| 5,476,526 A * | 12/1995 | Attermeyer | .................. | 55/496 |
| 5,492,551 A * | 2/1996 | Wolfe | .................. | 55/496 |
| 5,782,944 A * | 7/1998 | Justice | .................. | 55/499 |
| 5,837,022 A * | 11/1998 | Chapman | .................. | 55/496 |
| 5,968,217 A | 10/1999 | Stein | .................. | 55/496 |
| 6,044,892 A * | 4/2000 | Epstein | .................. | 55/503 |
| 6,152,980 A * | 11/2000 | Culwell | .................. | 55/496 |
| 6,214,076 B1 | 4/2001 | Beier | .................. | 55/484 |
| 6,284,010 B1 * | 9/2001 | Rehmert | .................. | 55/DIG. 31 |
| 6,454,834 B1 * | 9/2002 | Livingstone et al. | ...... | 55/385.3 |
| 6,623,540 B1 * | 9/2003 | Clayton et al. | ........ | 55/DIG. 31 |
| 6,716,267 B1 * | 4/2004 | Lawlor, Sr. | ............ | 55/DIG. 31 |
| 6,790,261 B1 * | 9/2004 | Delts | .................. | 55/501 |
| 6,860,916 B1 * | 3/2005 | Kubokawa et al. | ........... | 55/501 |

* cited by examiner

*Primary Examiner*—Jason M. Greene
(74) *Attorney, Agent, or Firm*—Buskop Law Group, P.C.; Wendy Buskop

(57) ABSTRACT

A method of manufacture includes the steps of laminating together a pleated filter media with an expanded wire forming a laminate; pleating the laminate forming a filter pack with a two pleated edges; forming an inner frame with inner front and back panels, an inner top side with two flaps and an inner bottom side with another two flaps; adhering the pleated first edge to the inner top side; inserting a support wire between the inner frame and the filter media; adhering the flaps together to form box to contain the filter media; forming an outer frame with outer front and back panels, an outer top side with two flaps and an outer bottom side with another two flaps; adhering the flaps together to form a second box to contain the filter media; inserting clips to engage the outer and inner frames forming an expandable air filter.

1 Claim, 7 Drawing Sheets

METHOD TO MAKE AN EXPANDABLE AIR FILTRATION APPARATUS AND DEVICE

FIELD OF THE INVENTION

The present embodiments relate to methods of manufacture of an expandable filter apparatus.

BACKGROUND OF THE INVENTION

Numerous means exist for removing particle matter from atmospheric air before introducing air into a heating, venting and/or air conditioning system. Usually these systems have one or more removable and replaceable rigid filter elements that are manufactured to a specific length and height and being that are inserted into a channeled filter housing to effectively seal the unit from the introduction of dust, dirt, and pollen.

Over time the filter element will be periodically replaced due to the build up of contaminants on the filter media that requires the technician to purchase a filter element from the original equipment manufacturer or some third party supplier whose sole business is manufacturing generic filter elements.

This system leaves the technician with little choice but to stock every conceivable filter element and to carry them around from job site to job site or order the replacement filter element and schedule a second on-site maintenance call to install the element when it arrives.

Not only does this cost the service technician by having to visit the same site twice and having to perform certain functions twice, but also is an inconvenience to the client, having to shut the system down again. There is also the case of being unable to find or order the filter cartridge due to the age of the equipment, thereby requiring the installation of a filter cartridge that almost fits, which further stresses an aged system that will require more frequent maintenance visits and more time to remove the inevitable buildup of dirt and debris from within the system that is entering from around the edges of an ill fitting filter cartridge. Customers can't or won't understand why their system performance is so poor and feel that their service bureau is more interested in selling them a new system rather than maintaining the one they have.

Additionally, the replaceable rigid filter elements allow significant contaminated, un-cleaned airflow to circulate around the replaceable rigid filter elements due to variations in tolerances of the replaceable rigid filter elements and the original equipment manufacturer's channeled filter housing. This bypass forces the technician to mechanically clean the original equipment manufacturer's air conditioning system and the attached ductwork and air distribution registers more frequently than necessary if proper air seal integrity were achievable and is detrimental to the mechanical and thermodynamic efficiency of the original equipment manufacturer's air conditioning system.

Further, the standard practice of employing a cardboard superstructure to give rigidity to replaceable filter element described in the prior art causes the rigidity to deteriorate during high humidity conditions or rainstorms. Thus, producing situations in which the replaceable rigid filter element is drawn out of the original equipment manufacturer's air conditioning system channeled filter housing and into the air moving fan, therefore destroying the replaceable rigid filter element's ability to filter at all. The use of this cardboard superstructure also blinds a portion of the replaceable rigid filter element and reduces the capacity of the element to capture and retain particulate matter. Finally, the use of this cardboard superstructure demands the use of wood fiber and is not environmentally conservative.

Therefore, it is felt that the need exists to provide the technician with the ability to fabricate the needed filter element on-site, on an as-needed basis and in a custom size providing a positive seal, eliminating the reliance on cardboard for rigidity all of which will reduce system maintenance, improve equipment performance, foster good customer relations, and assist in conserving valuable forest resources. Prior art reference includes Beier U.S. Pat. No. 6,214,076; Culwell U.S. Pat. No. 6,152,980; and Stein U.S. Pat. No. 5,968,217.

A need also exists to establish a method of manufacture by which the custom sized, expandable filters can be produced efficiently and cost effectively.

SUMMARY OF THE INVENTION

The current method of manufacture is for forming expandable filter media. The method entails laminating together a pleated filter media with an expanded wire forming a laminate and pleating the laminate forming a filter pack with a pleated first edge and a pleated second edge. The method continues by forming an inner frame, adhering the laminate to the frame, and inserting a support wire between the inner frame and the filter media. The corresponding flaps are adhered together in order to form a first box to contain the filter media. The method continues by forming an outer frame in manner similar to forming the inner frame. Clips are used engage the outer frame to the inner frame.

BRIEF DESCRIPTION OF THE DRAWINGS

The present method and apparatus will be explained in greater detail with reference to the appended figures, in which.

The present method and apparatus are detailed below with reference to the listed Figures.

DETAILED DESCRIPTION OF THE PREFERRED EMBODIMENTS

Before explaining the present method and apparatus in detail, it is to be understood that the method and apparatus are not limited to the particular embodiments and that it can be practiced or carried out in various ways.

An embodiment of the application is a method of manufacture for an expandable filter apparatus.

Figure 1:
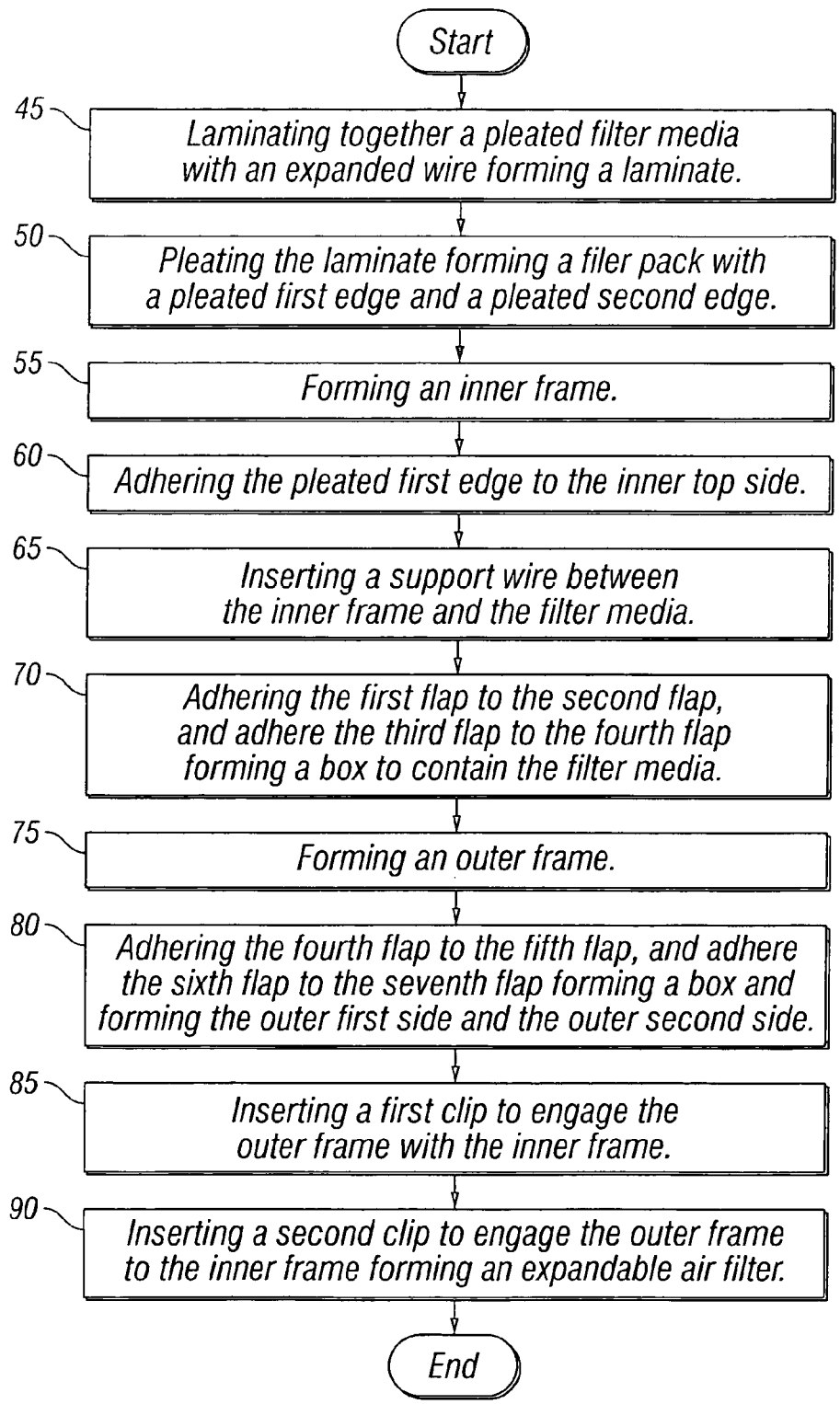
FIG. 1 is a schematic of the method of manufacture of the apparatus.

Referring to FIG. 1, the initial step of the method involves laminating together a pleated filter media with an expanded wire forming a laminate (45). The laminate is then pleated to form a filter pack with a pleated first edge and a pleated second edge (50).

The next step of the method entails forming an inner frame (55). The inner frame is an inner front panel, an inner back panel, an inner top side with a first flap and a second flap, an inner bottom side with a third flap and a fourth flap (55).

Continuing with FIG. 1, the method continues by adhering the pleated first edge to the inner top side (60); inserting a support wire between the inner frame and the filter media (65); and then adhering the first flap to the second flap, and adhere the third flap to the fourth flap forming a box to contain the filter media (70).

The step of the method entails forming an outer frame (75). The outer frame is an outer front panel, an outer back panel, an outer top side with a fifth flap and a sixth flap, an outer bottom side with a seventh flap and an eighth flap (75)

Both the inner frame and the outer frame can be constructed of materials such as plastic, cardboard, heavy paper, coated paper, and combinations thereof.

The method continues by adhering the fourth flap to the fifth flap, and adhere the sixth flap to the seventh flap forming a box and forming the outer first side and the outer second side (80).

As seen in FIG. 1, the final step of the method involves inserting a first clip to engage the outer frame with the inner frame (85) and inserting a second clip to engage the outer frame to the inner frame forming an expandable air filter (90).

An embodiment of the application is an apparatus (10) for air filtration. This apparatus can be used for air conditioning systems, heating systems, gas turbine systems, engine rooms, airplane fresh air intakes, and air purifiers. It can also be used for school systems, hospitals, homes, commercial buildings, aircraft carriers, boats, oil rigs, industrial plants, compressors, electrical control panels, and other end uses.

This method is particularly useful as the method can use recycled materials to form the filter. Recycled materials have a significant environmental benefit in minimizing waste.

Figure 2:
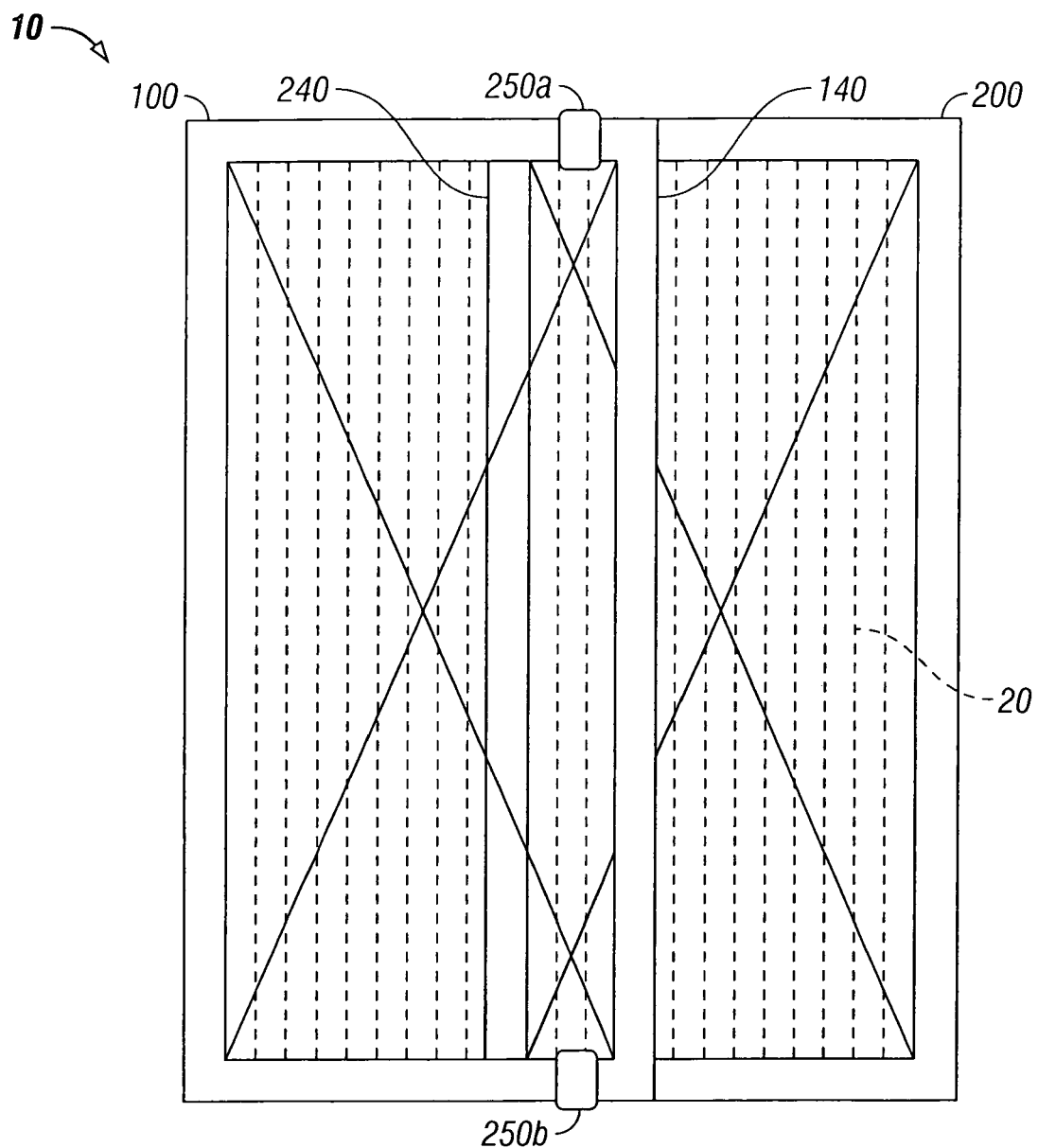
FIG. 2 depicts a front view of the apparatus.

FIG. 2 shows the preferred embodiment of the apparatus. The apparatus contains an outer frame (100), an inner frame (200), and a pleated filter media (20). The material of the outer frame and the inner frame is preferably contemplated to be cardboard, wax coated cardboard, chip board, beverage board, paper board with a certain level of stiffness, and recyclable board.

The inner frame (200) slides into the outer frame (100) through the second outer side (140) of the outer frame (100). The inner frame preferably snugly fits within the outer frame yet enables sliding of the inner frame against the outer frame.

The inner frame (200) has a second inner side (240) that is open. The opened second inner side (240) and the opened second outer side (140) allow the pleated filter media (20) to cover both panels. Since the inner panel (200) slides back and forth in the outer panel (100), the apparatus (10) can be easily adjusted to a necessary length.

The outer frame (100) and an inner frame (200) are held together by a number of clips (250). FIG. 2 depicts the outer frame (100) and an inner frame (200) being held together with two clips (250a and 250b). The number of clips required is dependent upon the size of the frames. One clip will suffice if the frames are small enough, but the preferred embodiment is to use two or more clips.

Figure 2A:
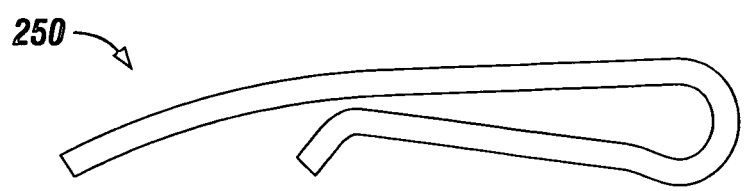
FIG. 2a depicts the clip used in the apparatus.

FIG. 2a depicts a preferred clip (250) used in the apparatus. The size of the clip can vary depending upon the size of the inner and outer frames. The clips are available from Advanced Plastics of Houston.

In a preferred embodiment, the pleated filter media is an electrostatic filter. The electrostatic filter is made of a synthetic non-woven material, but can also be a cotton blend. The filter media is available from Kimberly Clark of Atlanta, Ga., Columbus Industries of North Carolina, and HRS Textiles of North Carolina. The synthetic electrostatic filter can have polyolefin fibers, while the cotton blend filter can have polypropylene/polyester fibers. This style of filter promotes high efficiency with a low pressure drop, no fiber shedding, and no moisture absorption. Other filter alternatives include carbon impregnated polyester and filter media with an antimicrobial coating.

Figure 3:
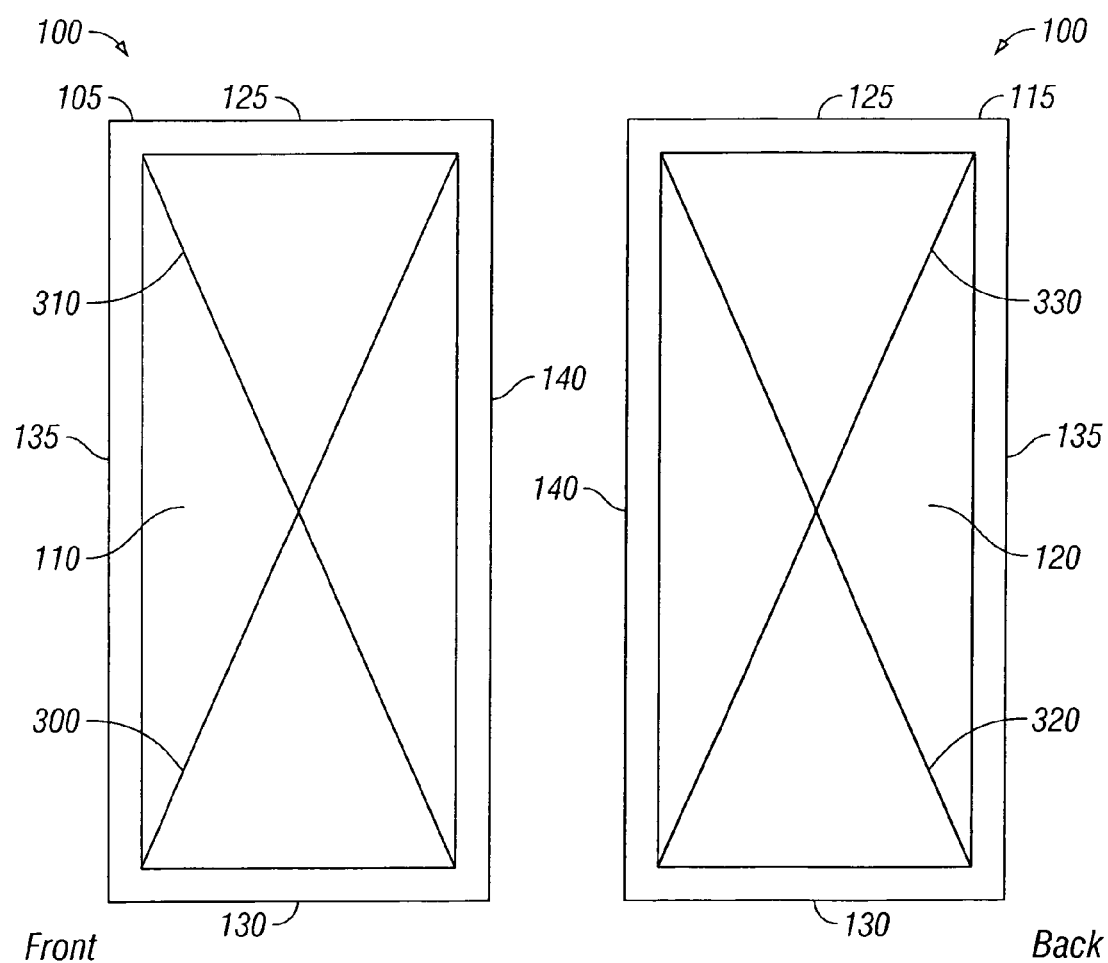
FIG. 3 depicts a front view the two inter-engaging panels of the front frame.

FIG. 3 is a view of the two parts of the outer frame (100). The outer frame has an outer front panel (105), an outer back panel (115), an outer top side (125), an outer bottom side (130), an outer first side (135), and an outer second side (140). The outer front panel (105) and outer back panel (115) are connected at the outer top side (125), the outer bottom side (130), and the outer side (135). The outer front panel and outer back panel are not connected on the outer second side (140). The outer second side (140) remains open to allow the inner panel (200) to slide through and to allow the pleated filter media (20) to stretch across both frames. The outer front panel (105) and the outer back panel (115) each have at least two supports members (300, 310, 320, and 330). The support members create an open space in both the outer front panel (105) and the outer back panel (115). The spaces, an outer front panel opening (110) and an outer back panel opening (120), allow air to pass though the apparatus across the pleated filter media (20). In a preferred embodiment, the sides are glued together to form the panels.

Figure 4:
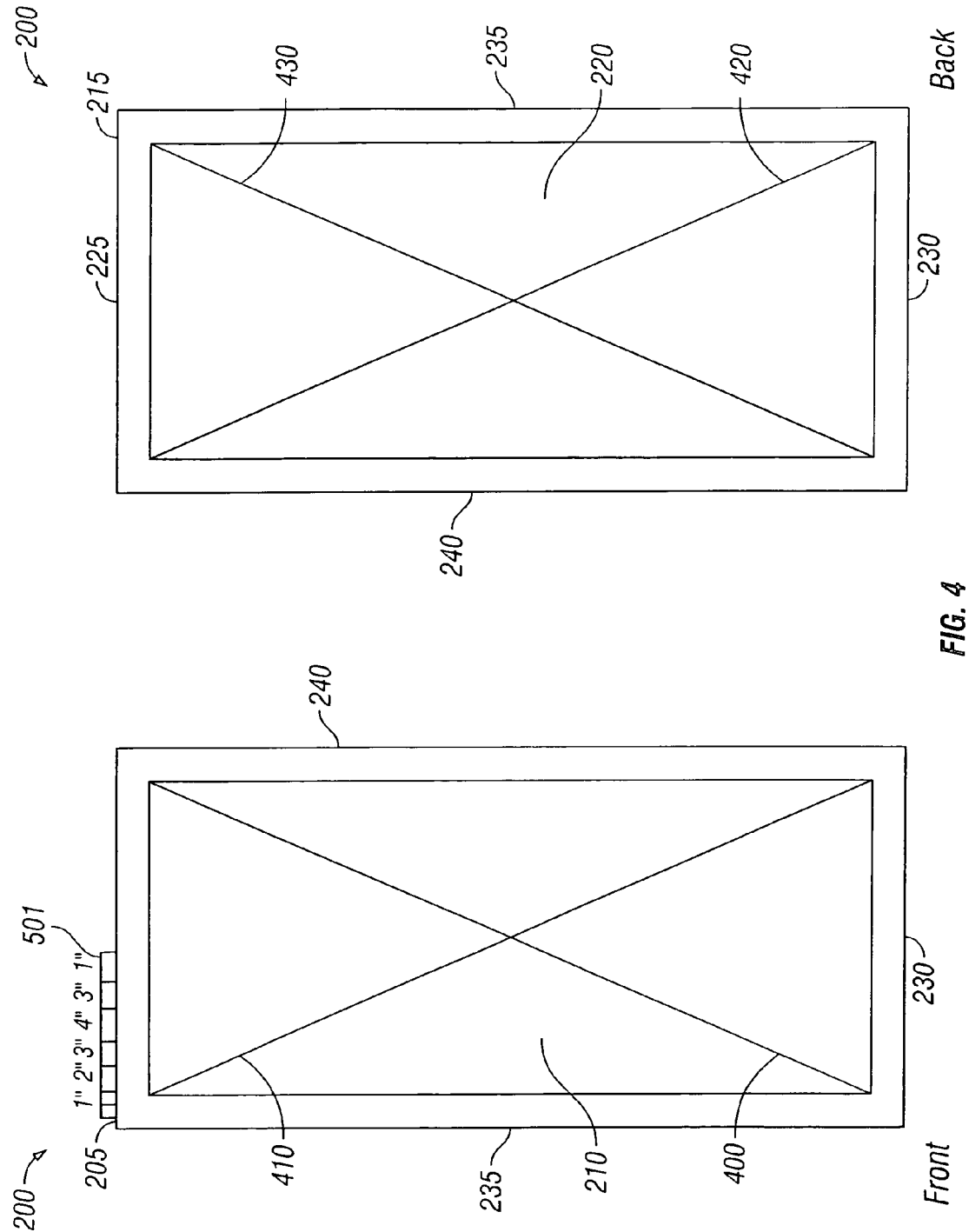
FIG. 4 depicts a front view of the two inter-engaging panels of the back frame.

FIG. 4 is a view of the two parts of the inner frame (200). The inner frame (200) is similar to the outer frame (100) shown in FIG. 3. The inner frame (200) has an inner front panel (205), an inner back panel (215), an inner top side (225), an inner bottom side (230), an inner first side (235), and an inner second side (240). The inner front panel (205) and inner back panel (215) are connected at the inner top side (225), the inner bottom side (230), and the inner side (235). Again, the front panel (205) and back panel (215) are not connected on the inner second side (240) to allow the pleated filter media (20) to stretch across both panels. The inner front panel (205) has at least two inner front supports members (400 and 410) to create an inner front panel opening (210). The inner back panel (215) also has at least two inner back supports members (420 and 430) to create an inner back panel opening (220). Again, the openings allow air to pass though the apparatus across the pleated filter media (20). The inner frame (200) can also include a measuring tape (501).

Figure 5:
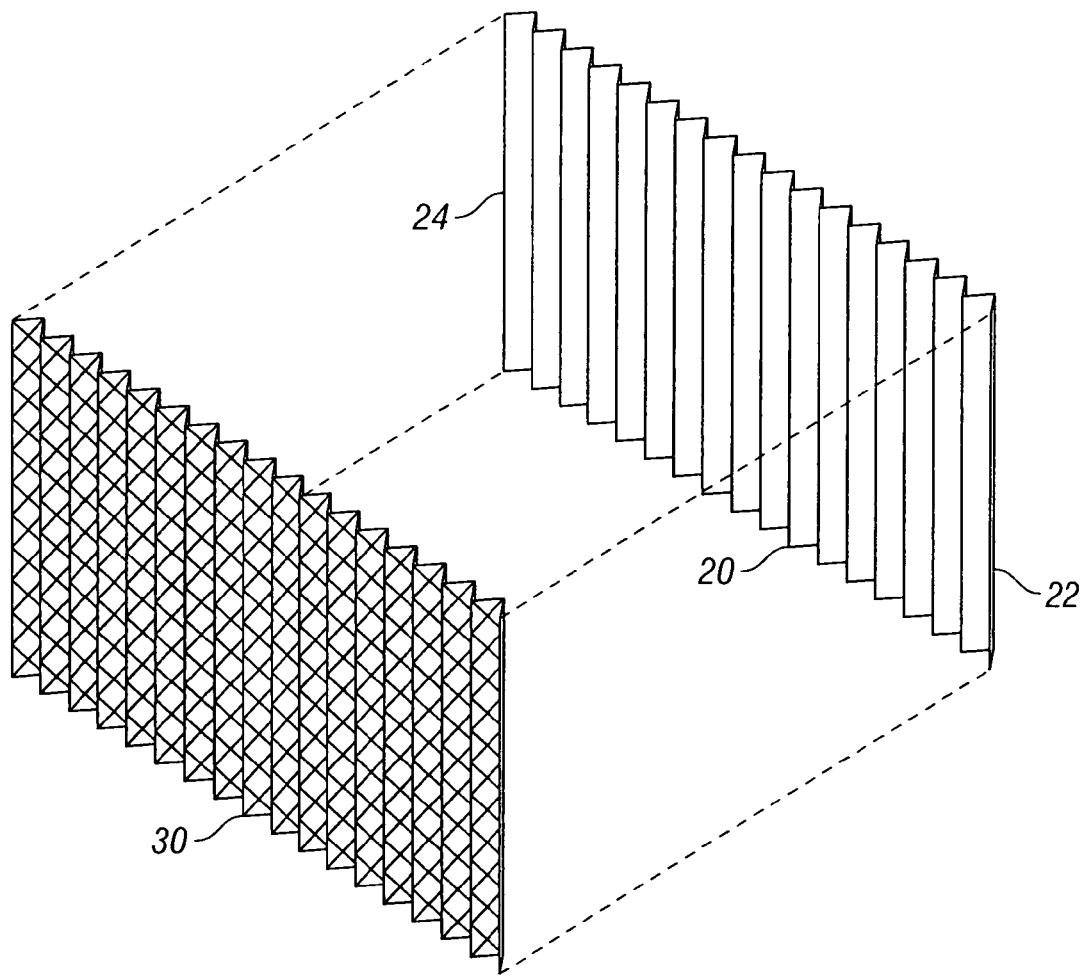
FIG. 5 depicts an expanded perspective view of the expandable mesh laminated onto the pleated filter media.

The pleated filter media (20) has a pleated first edge (22) and a pleated second edge (24), as shown in FIG. 5. An expandable mesh (30) is portioned on one side of the pleated filter media (20). A typical expanded mesh usable in this apparatus is available from Expanded Technology, of Brunswick Me. or Dorstener of Houston, Tex.

The expandable mesh (30) is laminated to the pleated filter media (20). The expandable mesh (30) can be laminated with hot glue. The pleats in the pleated filter media (20) allow the material to shrink and expand with the changing length of the apparatus. The pleated filter media (20) can have between 4 pleats per foot and 30 pleats per foot. The expandable mesh (30) can also be an expanded aluminum mesh. The bonded wire mesh is laminated to the filter media. Further, the wire mesh can be a welded wire.

The apparatus can also have a locking component (500) disposed on the outer frame to prevent movement of the inner frame while supporting the filter media. FIG. 5 shows the locking components (500). The locking component can be tape or a slidable tab.

Figure 6:
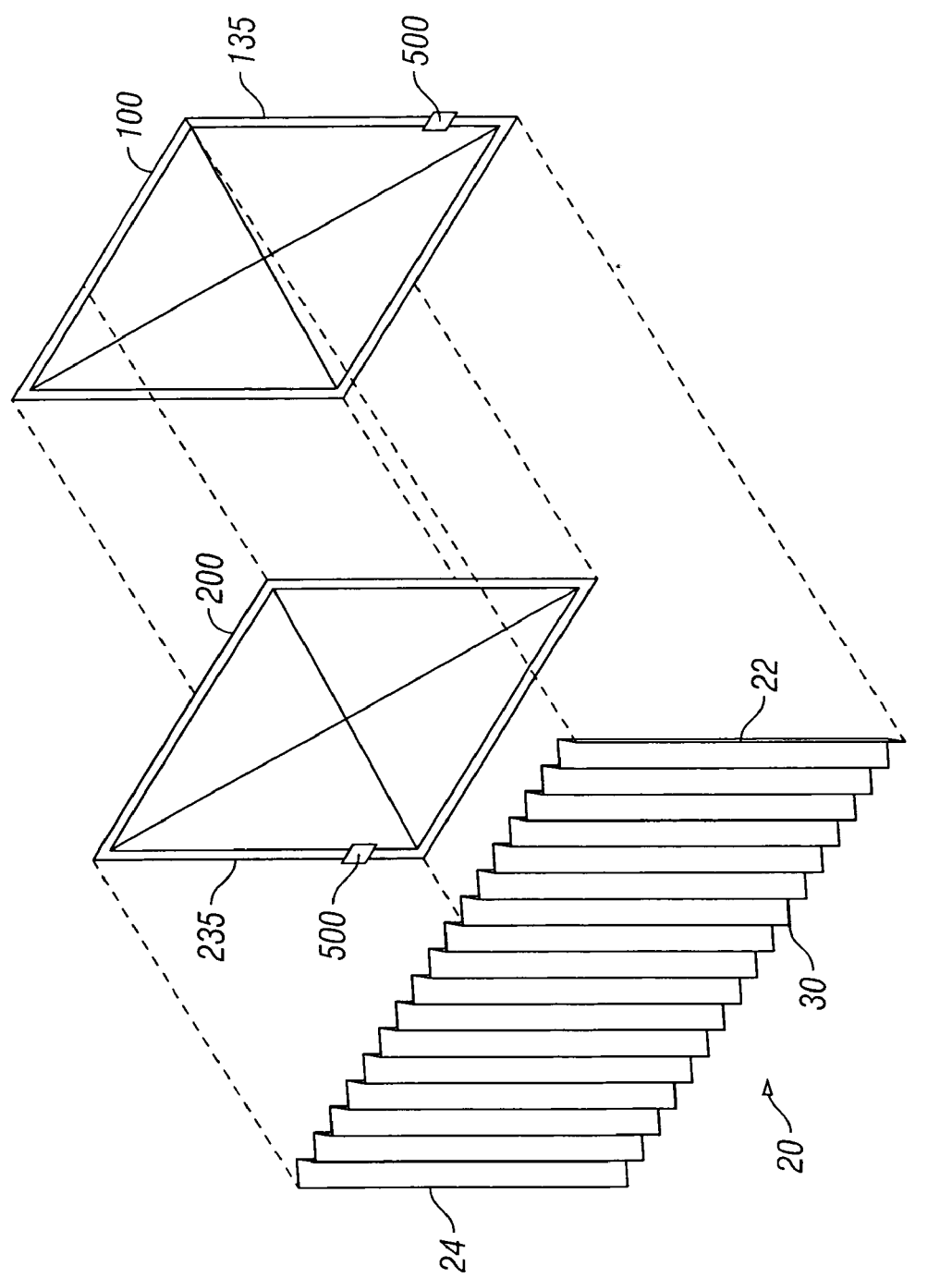
FIG. 6 depicts an expanded perspective view of the pleated filter media as it fits into the back and front panels.

FIG. 6 is an expanded perspective view of the apparatus. In particular, FIG. 6 shows that the pleated filter media (20) is disposed inside the outer frame (100) and the inner frame (200). The pleated first edge (22) is attached to the outer first side (135) of the outer frame (100). The pleated second edge (24) is attached to the inner first side (235) of the inner frame (200). Since the pleated filter media (20) is attached in such a manner, the media can expand and shrink with the length of the apparatus as the inner frame (200) slides in and out of the outer frame (100) affecting the overall length.

Figure 7A:
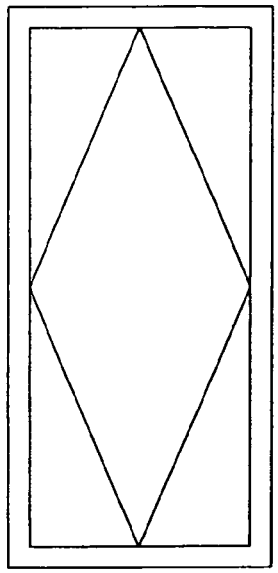
FIG. 7a depicts a front view of support members in a "diamond" shape.
Figure 7B:
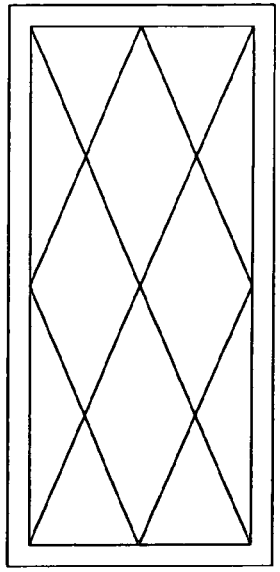
FIG. 7b depicts a front view of support members in a combination of the "diamond" shape and the "X" shape.
Figure 7C:
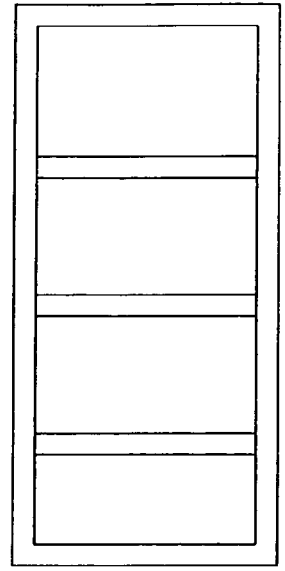
FIG. 7c depicts a front view of three support members in a parallel orientation.
Figure 7D:
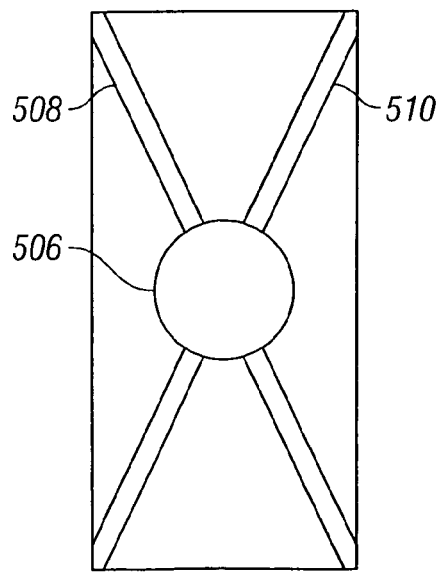
FIG. 7d depicts a is a front view of a support configuration having a circle with a plurality of support arms.

The support members can form an "X" shape, a "diamond" shape, cut design, rectangular shape, square shape, a shape of a circle with radial arms, or combinations thereof. The die cut design can be a logo for a company. FIG. 2 through FIG. 6 shows the embodiment of the "X" shape. FIG. 7a shows the embodiment of the diamond" shape. FIG. 7b shows the embodiment of the combination of the "X" shape and the "diamond" shape. FIG. 7c shows the embodiment of the rectangular shape, three support members in a parallel orientation. FIG. 7d shows the embodiment of a circle (506) with radial arms (508 and 510). The alternative embodiments of support member shapes can be found in the outer front panel (105), the outer back panel (115), the inner front panel (205), and the inner back panel (215).

The filter is contemplates to have thickness that ranges from ½ inch to 12 inches. The preferred thicknesses are ¾ inch, 1 and ¾ inch, 3 and ¾ inches. Any width within this range is acceptable. Also, as to size for the apparatus, it is contemplated that for a 1, 2 or 4 inch pleat, the range for a nominal size would run from 12 inches×12 inches×1 inch to 25 inches×50×1 inches, and for an actual size, would range from 11.5×11.5×1 through 24.5×49.5×1 inch.

The outer frame (100) and the inner frame (200) can have the shape of a rectangle, square, or circle. The preferred embodiment is a rectangle.

Figure 7E:
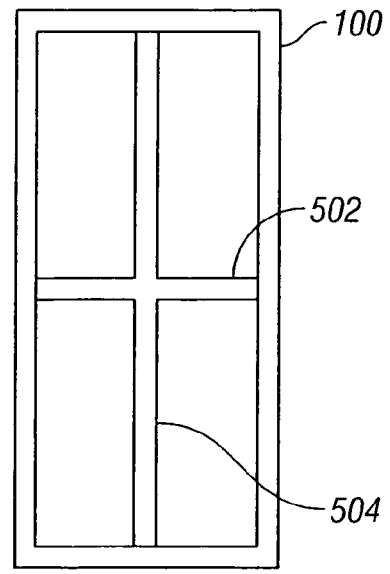
FIG. 7e depicts front view of a support configuration wherein at least one vertical member and one horizontal member are used.

The outer frame (100) can have a first horizontal support and a first vertical support and the inner frame (200) can have a second horizontal support and a second vertical support. FIG. 7e is a front view of a support configuration wherein at least one vertical (504) member and one horizontal member (502) are used in the outer frame (100). Again, in alternative embodiments, this support member shape can be found in the outer front panel (105), the outer back panel (115), the inner front panel (205), and the inner back panel (215).

In another alternative, the outer frame (100) can have a first circle support member engaging at least two opposing edges on the first frame and the inner frame (200) can have a second circle support member engaging at least two opposing edges on the second frame.

The outer frame and the inner frame are notched to support the clips. The outer and inner frame also can be constructed of plastic, cardboard, heavy paper, beverage board, craft paper, combinations thereof, or similar construction materials. The outer frame and the inner frame can also be coated.

While this method and apparatus have been described with emphasis on the preferred embodiments, it should be understood that within the scope of the appended claims, the method and apparatus might be practiced other than as specifically described herein.

What is claimed is:

1. A method of manufacture comprising the steps:
    a. laminating together a pleated filter media with an expanded wire forming a laminate;
    b. pleating the laminate forming a filter pack with a pleated first edge and a pleated second edge;
    c. forming an inner frame selected from the group consisting of plastic, cardboard, heavy paper, coated paper, and combinations thereof, wherein the inner frame comprises an inner front panel, an inner back panel, an inner top side with a first flap and a second flap, an inner bottom side with a third flap and a fourth flap;
    d. adhering the pleated first edge to the inner top side;
    e. inserting a support wire between the inner frame and the filter media;
    f. adhering the first flap to the second flap and adhering the third flap to the fourth flap forming an inner box to contain the filter media;
    g. forming an outer frame selected from the group consisting of plastic, cardboard, heavy paper, coated paper and combinations thereof, wherein the outer frame comprises an outer front panel an outer back panel, an outer top side with a fifth flap and a sixth flap, an outer bottom side with a seventh flap and an eighth flap;
    h. adhering the fifth flap to the sixth flap and adhering the seventh flap to the eighth flap forming an outer box and forming an outer first side and an outer second side;
    i. inserting a first clip to engage the outer frame with the inner frame; and
    j. inserting a second clip to engage the outer frame to the inner frame forming an expandable air filter.

* * * * *